(12) United States Patent
Honda et al.

(10) Patent No.: US 11,767,269 B2
(45) Date of Patent: Sep. 26, 2023

(54) METHOD FOR SPRAY APPLICATION OF MONOLITHIC REFRACTORY AND SPRAY MATERIAL FOR USE THEREIN

(71) Applicant: KROSAKIHARIMA CORPORATION, Fukuoka (JP)

(72) Inventors: Kazuhiro Honda, Fukuoka (JP);
Kazunori Seki, Fukuoka (JP);
Yoshitaka Ishii, Fukuoka (JP);
Takafumi Yamada, Fukuoka (JP);
Norikazu Shirama, Fukuoka (JP);
Tsubasa Nakamichi, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 474 days.

(21) Appl. No.: 16/979,951

(22) PCT Filed: Mar. 6, 2019

(86) PCT No.: PCT/JP2019/008840
§ 371 (c)(1),
(2) Date: Sep. 11, 2020

(87) PCT Pub. No.: WO2019/181505
PCT Pub. Date: Sep. 26, 2019

(65) Prior Publication Data
US 2021/0017088 A1 Jan. 21, 2021

(30) Foreign Application Priority Data

Mar. 23, 2018 (JP) .................................. 2018-056020
Mar. 23, 2018 (JP) .................................. 2018-056026

(51) Int. Cl.
*C04B 35/66* (2006.01)
*B05B 7/24* (2006.01)
(Continued)

(52) U.S. Cl.
CPC ................ *C04B 35/66* (2013.01); *B05B 7/24* (2013.01); *B05D 1/02* (2013.01); *C04B 35/6263* (2013.01);
(Continued)

(58) Field of Classification Search
CPC .............. C04B 35/66; C04B 35/62222; C04B 35/6263; C04B 35/6264; B05D 1/02
See application file for complete search history.

(56) References Cited

U.S. PATENT DOCUMENTS 7,762,475 B2 7/2010 Ohata et al.
2007/0241204 A1* 10/2007 Ohata ..................... C23C 24/04
239/10

FOREIGN PATENT DOCUMENTS

JP 4-332387 A 11/1992
JP 2000-192121 A 7/2000
(Continued)

OTHER PUBLICATIONS

International Search Report dated May 15, 2019 for PCT/JP2019/008840 filed Mar. 6, 2019.
(Continued)

*Primary Examiner* — Nathan T Leong
(74) *Attorney, Agent, or Firm* — Paul D. Bianco; Fleit Intellectual Property Law

(57) ABSTRACT

To improve the stability of spray application of a monolithic refractory in which a water injector is disposed in a material carrier pipe extending from a material supply device to a distal spray nozzle, and application water is injected from the water injector into a spray material that is being carried through the material carrier pipe, a ratio of a flow volume of an application water carrier gas for carrying the application water to be introduced into the water injector to a flow volume of a spray material carrier gas for carrying the spray
(Continued)

material is set to 0.07 to 2, and a compressibility index of the spray material is set to 32% or less. Alternatively, a ratio of a flow volume of an application water carrier gas for carrying the application water to be introduced into the water injector to an application water volume is set to 100 to 1,000.

8 Claims, 1 Drawing Sheet

(51) Int. Cl.
  B05D 1/02      (2006.01)
  C04B 35/622    (2006.01)
  C04B 35/626    (2006.01)
  F27D 1/00      (2006.01)
(52) U.S. Cl.
  CPC .... *C04B 35/6264* (2013.01); *C04B 35/62222* (2013.01); *F27D 1/0006* (2013.01)

(56) References Cited

FOREIGN PATENT DOCUMENTS

| | | |
|---|---|---|
| JP | 2007-8766 A | 1/2007 |
| JP | 4377913 | 12/2009 |
| JP | 2011-208837 A | 10/2011 |
| WO | 2005/121676 A1 | 12/2005 |

OTHER PUBLICATIONS

Written Opinion for PCT/JP2019/008840 filed Mar. 6, 2019.
International Preliminary Report on Patentability dated Sep. 29, 2020 with Written Opinion for PCT/JP2019/008840 filed Mar. 6, 2019 (English translation).

* cited by examiner

METHOD FOR SPRAY APPLICATION OF MONOLITHIC REFRACTORY AND SPRAY MATERIAL FOR USE THEREIN

FIELD

The present invention relates to a method for spray application of a monolithic refractory, used for building or repairing various types of molten metal containers and kilns, such as a blast furnace, a trough, a torpedo car, a converter, a ladle, a secondary refining furnace, a tundish, a cement rotary kiln, a waste melting furnace, an incinerator, or a nonferrous molten metal container, and also relates to a spray material for use in this method.

BACKGROUND

A method for spray application of a monolithic refractory can be roughly classified into a wet application method and a dry application method.

In the wet application method, a spray material slurried by adding application water to a raw material and kneading them is pressure-fed, and sprayed together with, for example, an accelerator added thereto in a distal spray nozzle section. In the dry application method, a spray material is carried by gas in a dry state, and sprayed together with application water injected thereinto in a distal spray nozzle section.

As compared with the dry application method, the wet application method has advantages, for example, of being able to form a dense refractory spray-applied product excellent in adhesion and to reduce an amount of dust generation during the application. At the same time, the wet application method has the following disadvantages. The spray application requires a kneading device and a slurry pressure-feeding device, which are structurally complicated and costly. A time-consuming post-spraying operation of cleaning the slurried spray material attached on the kneading device and an inner surface of a carrier hose is also needed.

In this respect, the dry application method is basically performed by simply injecting application water into the gas-carried dry spray material in the distal spray nozzle section. This allows a spray apparatus to be simplified and operation efficiency to be improved. However, the spray material is sprayed in a state not sufficiently mixed with water (application water). Thus, a large amount of dust is generated during the spraying, and a refractory structure of a spray-applied product is apt to become nonuniform, to cause deterioration in deposit efficiency, bonding strength and corrosion resistance. The dry application method also has a disadvantage of difficulty in obtaining a dense spray-applied product due to a lower kneading effect and a larger amount of application water as compared with the wet application method.

Thus, the dry application method has been improved to provide a spray application method in which two water injectors are arranged in a material carrier pipe extending from a material supply device to a distal spray nozzle, and water particles having an average particle size of 100 μm or less are injected together with compressed air from each of the two water injectors (e.g., see Patent Literature 1).

In performing spray application using this spray application method many times, however, the present inventors have often observed a phenomenon of variation in a discharge volume of a spray material, and separation between the spray material and application water, to conclude that there is room for improvement in the stability of the spray application.

CITATION LIST

Patent Literature

Patent Literature 1: Japanese Patent No. 4377913

SUMMARY

Technical Problem

An object of the present invention is to improve the stability of spray application in a method for spray application of a monolithic refractory in which a water injector is disposed in a material carrier pipe extending from a material supply device to a distal spray nozzle, and application water is injected from the water injector into a spray material that is being carried through the material carrier pipe.

Solution to Problem

The present inventors have carried out many tests based on a viewpoint that improving a water mixability of application water with a spray material and a carriage property of the spray material plays an important role in improving the stability of spray application, and have discovered that a ratio of a flow volume ($Nm^3$/min) of an application water carrier gas for carrying application water to be introduced into a water injector to a flow volume ($Nm^3$/min) of a spray material carrier gas for carrying a spray material, and a compressibility index of the spray material are important parameters in improving the water mixability and the carriage property to lead to an improvement in the stability of the spray application, thereby accomplishing one embodiment of the present invention.

The present inventors have also discovered that a ratio of a flow volume ($Nm^3$/min) of an application water carrier gas for carrying application water to be introduced into a water injector to an application water volume ($m^3$/min) is an important parameter in improving the water mixability and the carriage property to lead to an improvement in the stability of the spray application, thereby accomplishing another embodiment of the present invention.

That is, according to one embodiment of the present invention, the following method for spray application is provided.

A method for spray application of a monolithic refractory, including disposing a water injector in a material carrier pipe extending from a material supply device to a distal spray nozzle, and injecting application water from the water injector into a spray material that is being carried through the material carrier pipe, in which a ratio of a flow volume ($Nm^3$/min) of an application water carrier gas for carrying the application water to be introduced into the water injector to a flow volume ($Nm^3$/min) of a spray material carrier gas for carrying the spray material (the flow volume of the application water carrier gas/the flow volume of the spray material carrier gas) is 0.07 to 2, and a compressibility index of the spray material is 32% or less.

According to another embodiment of the present invention, the following method for spray application is provided.

A method for spray application of a monolithic refractory, including disposing a water injector in a material carrier pipe extending from a material supply device to a distal spray nozzle, and injecting application water from the water injector into a spray material that is being carried through the material carrier pipe, in which a ratio of a flow volume ($Nm^3/min$) of an application water carrier gas for carrying the application water to be introduced into the water injector to an application water volume ($m^3/min$) (the flow volume of the application water carrier gas/the application water volume) is 100 to 1,000.

According to another aspect of the present invention, there is provided a spray material for use in the method for spray application of a monolithic refractory of the present invention, in which the spray material has a compressibility index of 32% or less.

Advantageous Effects of Invention

In accordance with the present invention, the water mixability of the application water with the spray material and the carriage property of the spray material during the spray application are improved, resulting in the improvement in the stability of the spray application.

DESCRIPTION OF EMBODIMENTS

First, an example of a spray apparatus for performing a spray application method of the present invention will be described with reference to FIG. 1.

Figure 1:
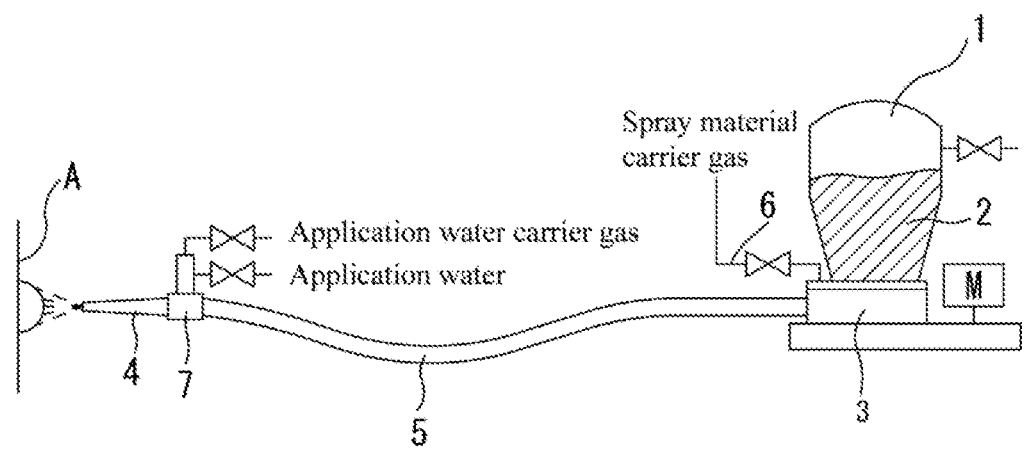
FIG. 1 is a conceptual diagram illustrating an example of a spray apparatus for performing a spray application method of the present invention.

In FIG. 1, reference numeral 1 denotes a material supply device containing a spray material 2. The material supply device 1 may be any type used in a conventional spray apparatus for a monolithic refractory and adapted to quantitively discharge a spray material therefrom, such as a rotektor gun, a lead gun and a Nogami cement gun.

Gas such as compressed air is supplied into the material supply device 1 to adjust an inner pressure thereof. The spray material 2 contained in the material supply device 1 is fed to a material carrier pipe 5 extending from the material supply device 1 to a distal spray nozzle 4 by a table feeder 3 that is driven by a motor M disposed at a lower end of the material supply device 1.

A spray material carrier gas is supplied from a spray material carrier gas introduction pipe 6 of the table feeder 3 into the material carrier pipe 5 to allow the spray material 2 from the material supply device 1 to be spray-applied from the distal spray nozzle 4 of the material carrier pipe 5 onto a spray target object A.

In the material carrier pipe 5, a water injector 7 is disposed close to the distal spray nozzle 4.

The water injector 7 supplies application water together with an application water carrier gas to the spray material 2 that is being carried through the material carrier pipe 5. The water injector 7 may have any structure that allows the application water together with the application water carrier gas to be supplied (injected) into the material carrier pipe 5. The application water, which is injected from the water injector 7 together with the application water carrier gas, is turned into so-called atomized water (water particles).

The water injector 7 is disposed at a position apart from a distal end of the distal spray nozzle 4 within a range of, preferably 0.5 m to less than 5 m, and more preferably 0.5 m to less than 3 m. The distal spray nozzle 4 has a length of roughly 1 m to 10 m.

The gases used in the present invention, such as the spray material carrier gas and the application water carrier gas, are typically air (compressed air). For example, other gases such as nitrogen (compressed nitrogen) can be also used. Pressures of the used gases can be set within a range of roughly 0.2 MPa to 0.5 MPa.

Next, the spray application method of the present invention will be described based on an embodiment using the spray apparatus in FIG. 1.

A first feature in one embodiment of the spray application method of the present invention is that a ratio of a flow volume ($Nm^3/min$) of the application water carrier gas for carrying the application water to be introduced into the water injector 7 to a flow volume ($Nm/min$) of the spray material carrier gas for carrying the spray material (the flow volume of the application water carrier gas/the flow volume of the spray material carrier gas)(hereinafter referred to as "carrier gas flow ratio") is set to 0.07 to 2. Setting the carrier gas flow ratio to 0.07 to 2 improves a water mixability of the application water and a carriage property of the spray material to improve the stability of the spray application.

If the carrier gas flow ratio is less than 0.07, the flow volume of the spray material carrier gas becomes excessive. Thus, the application water does not reach a center area of the material carrier pipe 5 carrying the spray material. This deteriorates the water mixability.

Meanwhile, if the carrier gas flow ratio is more than 2, the flow volume of the application water carrier gas becomes excessive. Thus, the application water carrier gas disturbs the flow of the spray material carrier gas. As a result, the spray material is attached on an area around the water injector 7, or further attached on the material carrier pipe 5 on an upstream side thereof. This deteriorates the carriage property of the spray material.

The carrier gas flow ratio is preferably 0.1 to 1.

A second feature in one embodiment of the spray application method of the present invention is that a spray material having a compressibility index of 32% or less is used. In other words, the spray material is used by adjusting its particle size composition or the like so as to set the compressibility index to 32% or less. The compressibility index is obtained by the following formula.

$$\text{Compressibility index (\%)} = (\text{tapped bulk density} - \text{loose bulk density})/\text{tapped bulk density} \times 100$$

As will be described in detail later, the spray material used in the present invention contains a fiber in addition to a refractory raw material powder in some cases. For the spray material containing a fiber, the compressibility index is evaluated (the tapped bulk density and the loose bulk density are measured) in a state excluding the fiber. That is, for the spray material containing a fiber, the compressibility index in the present invention is obtained by evaluating the spray material from which the fiber is removed.

When the application water is added to the spray material, a powder portion coming into contact with the application water becomes slurried and is apt to have a higher viscosity. A spray material having a compressibility index of more than 32%, which contains much air even in a statically placed state, is apt to be aggregated by an external force such as the application water carrier gas. Adding the application water further increases a partial slurry viscosity, increasingly accelerating the aggregation. Thus, the application water does not evenly wet the spray material to deteriorate the water mixability. If the spray material is considerably aggregated, the spray material is firmly attached on an inner surface of the material carrier pipe 5, causing clogging. This leads to deterioration in the carriage property.

The compressibility index is preferably 25% or less.

To set the compressibility index of the spray material to 32% or less, a content of particles having a particle size of more than 2 mm in 100 mass % of the spray material is preferably set to 30 mass % or less (including 0 mass %), and a content of particles having a particle size of 45 μm or less therein is preferably set to 3 mass % to 30 mass %.

That is, if the content of the particles having a particle size of more than 2 mm is more than 30 mass %, the particles having a particle size of more than 2 mm become excessive, and voids within the spray material become larger. Thus, fine particles flow into the voids by the external force to densify the spray material. This may increase the compressibility index to more than 32%.

If the content of the particles having a particle size of 45 μm or less is more than 30 mass %, the particles having a particle size of 45 μm or less become excessive, and the spray material contains more air. Thus, the spray material becomes easily aggregated by the external force. This may increase the compressibility index to more than 32%. If the content of the particles having a particle size of 45 μm or less is less than 3 mass %, a desired spray-applied product becomes difficult to form.

In the present invention, particles having a particle size of more than d means that the particles have a particle size remaining on a sieve with an aperture of d. Particles having a particle size of d or less means that the particles have a particle size passing through the sieve with an aperture of d.

A feature in another embodiment of the spray application method of the present invention is that a ratio of the flow volume ($Nm^3$/min) of the application water carrier gas to an application water volume ($m^3$/min) (the flow volume of the application water carrier gas/the application water volume) (hereinafter referred to as "gas/application water volume ratio") is set to 100 to 1,000. Setting the gas/application water volume ratio to 100 to 1,000 improves the water mixability of the application water and the carriage property of the spray material to further improve the stability of the spray application. The gas/application water volume ratio is preferably 250 to 800.

In the spray application method of the present invention, a ratio of a discharge volume (kg/min) of the spray material to a total flow volume ($Nm^3$/min) of the carrier gases (the discharge volume of the spray material/the total flow volume of the carrier gases)(hereinafter referred to as "solid/gas ratio") is preferably set to 1 to 20. Setting the solid/gas ratio to 1 to 20 improves the water mixability of the application water and the carriage property of the spray material to further improve the stability of the spray application.

The spray material used in the spray application method of the present invention may appropriately contain additives such as a binder, a dispersant and an accelerator, added to and mixed with the refractory powder. The spray material may also contain a fiber in addition to the additives.

The refractory powder may be any type of refractory powder used in conventional monolithic refractories. Examples thereof include metal oxides, metal carbides, metal nitrides, carbons and metals, which can be appropriately selected and combined according to, for example, a material of a spray target object and temperature conditions.

Examples of the binder include slaked lime, alumina cement, magnesia cement, phosphate and silicate, one of which may be used, or two or more of which may be combined and used.

The dispersant is also termed deflocculant, and provides an effect of imparting flowability to the spray material. The dispersant may be any type used in conventional monolithic refractories. Specific examples thereof include sodium tripolyphosphate, sodium hexametaphosphate, sodium ultrapolyphosphate, acid sodium hexametaphosphate, sodium borate, sodium carbonate, mineral salts such as polymetaphosphate, silicate and phosphate, sodium citrate, sodium tartrate, sodium polyacrylate, sodium sulfonate, polycarboxylate, β-naphthalenesulfonate salts, naphthalenesulfonate, and carboxylic polyether-based dispersant.

The accelerator reacts with the binder in the presence of application water so as to quickly cure the spray material and impart adhesion to the spray material. The accelerator may be initially mixed in the spray material in a powder form, or may be also added thereto from the distal spray nozzle 4 or the water injector 7. When the accelerator is added from the distal spray nozzle 4 or the water injector 7, a liquid prepared by diluting the accelerator with water may be used according to need.

Specific examples of the accelerator include: silicates such as sodium silicate and potassium silicate; aluminates such as sodium aluminate, potassium aluminate and calcium aluminate; carbonates such as sodium carbonate, potassium carbonate and sodium hydrogen carbonate; sulfates such as sodium sulfate, potassium sulfate and magnesium sulfate; calcium aluminate compounds such as $CaO \cdot Al_2O_3$, $12CaO \cdot 7Al_2O_3$, $CaO \cdot 2Al_2O_3$, $3CaO \cdot Al_2O_3$, $3CaO \cdot 3Al_2O_3 \cdot CaF_2$ and $11CaO \cdot 7Al_2O_3 \cdot CaF_2$; and calcium salts such as calcium oxide, calcium hydroxide and calcium chloride.

The fiber may be any type used for preventing explosive fracture or the like in conventional monolithic refractories, such as vinylon, nylon, PVA, polyvinyl, polystyrene, polypropylene, and carbon.

The spray application method of the present invention can be performed under any temperature conditions such as cold, warm and hot. A material composition of the spray material used in the spray application method of the present invention can be appropriately determined according to, for example, the temperature conditions and the material of the spray target object.

Figure 2:
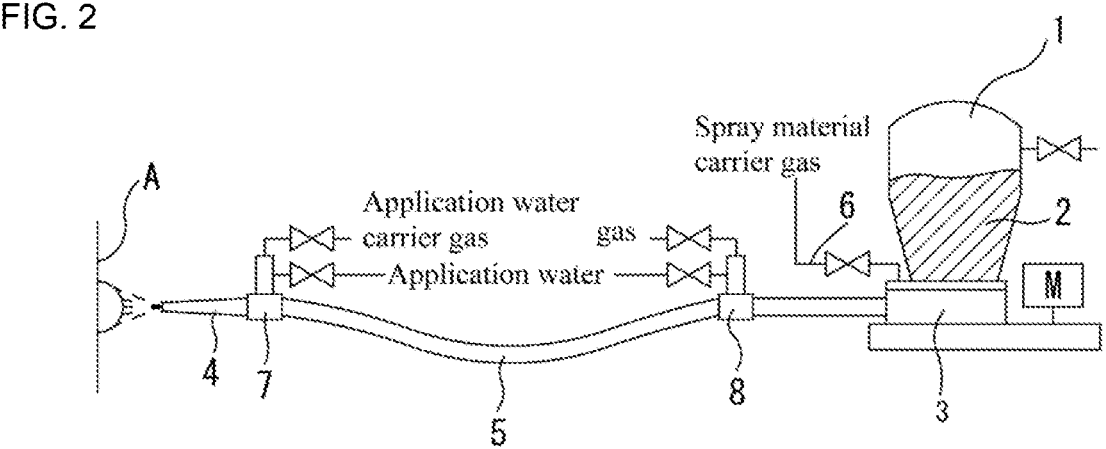
FIG. 2 is a conceptual diagram illustrating another example of the spray apparatus for performing the spray application method of the present invention.

FIG. 2 illustrates another example of the spray apparatus for performing the spray application method of the present invention. In the spray apparatus in FIG. 2, injecting means 8 is disposed on an upstream side of the water injector 7.

When the spray apparatus with the injecting means 8 disposed on the upstream side of the water injector 7 as illustrated in FIG. 2 is used in the spray application method of the present invention, an application water volume from the injecting means 8 is preferably set to 20 mass % or less (including 0 mass %) of a total application water volume, the remaining application water volume of which is injected from the water injector 7. Employing such an application water injection balance improves the water mixability of the application water and the carriage property of the spray material to further improve the stability of the spray application in using the injecting means 8.

When the injecting means 8 injects the gas or the application water together with the gas, a flow volume ($Nm^3$/min) of the gas injected from the injecting means 8 is added as "the flow volume (Nm/min) of the application water carrier gas" in the above calculations of the carrier gas flow ratio and the gas/application water volume ratio.

Similarly, the application water volume (m/min) from the injecting means 8 is added as "the application water volume ($m^3$/min)" in the above calculation of the gas/application water volume ratio.

As described above, in the spray application method of the present invention, the ratio of the discharge volume (kg/min) of the spray material to the total flow volume ($Nm^3$/min) of the carrier gases (the discharge volume of the spray material/the total flow volume of the carrier gases). i.e., the solid/gas ratio is preferably set to 1 to 20. "The total flow volume ($Nm^3$/min) of the carrier gases" used for calculating the solid/gas ratio is a total flow volume ($Nm^3$/min) of the flow volume ($Nm^3$/min) of the spray material carrier gas from the spray material carrier gas introduction pipe 6, the flow volume ($Nm^3$/min) of the application water carrier gas from the water injector 7, and the flow volume ($Nm^3$/min) of the gas from the injecting means 8 when the injecting means 8 is used.

EXAMPLES

First Set of Examples

Table 1 lists a first set of examples of the present invention. In the examples, the spray apparatus in FIG. 1 was used to perform the spray application. That is, the application water and the application water carrier gas were supplied only from the water injector 7 in the examples. The pressures of the application water carrier gas and the spray material carrier gas were set within the range of 0.2 MPa to 0.5 MPa.

Alumina-silica powder as the refractory powder, slaked lime as the binder, and silicate as the dispersant were mixed in a predetermined ratio and used as the spray material. The water mixability and the carriage property obtained in spraying this spray material in the spray apparatus in FIG. 1 were evaluated. A comprehensive evaluation was made based on these evaluation results.

The water mixability was evaluated based on a degree of separation between the application water and the spray material by visually observing a spray state from the distal spray nozzle 4. A smaller degree of separation means a better water mixability. To be more specific, a case with no separation was evaluated as good, a case with small separation as fair, and a case with large separation as poor.

The carriage property was evaluated based on a degree of variation in the discharge volume of the spray material by visually observing a spray state from the distal spray nozzle 4. A smaller degree of variation in the discharge volume means a better carriage property. To be more specific, a case with no variation in the discharge volume was evaluated as good, a case with slight variation in the discharge volume as fair, and a case with large variation in the discharge volume as poor.

The comprehensive evaluation was made on the following three-level scale based on the evaluation results of the water mixability and the carriage property.

Good: Both evaluation results were good.
Fair: At least one evaluation result was fair, and none of the evaluation results was poor.
Poor: At least one evaluation result was poor.

TABLE 1

| | | Example 1 | Example 2 | Example 3 | Example 4 | Example 5 | Example 6 |
|---|---|---|---|---|---|---|---|
| Spray material | Particle size: more than 2 mm (mass %) | 30 | 15 | 15 | 15 | 15 | 15 |
| | Particle size: more than 45 μm to 2 mm (mass %) | 40 | 70 | 70 | 70 | 70 | 70 |
| | Particle size: 45 μm or less (mass %) | 30 | 15 | 15 | 15 | 15 | 15 |
| | Compressibility index (%) | 32 | 25 | 25 | 25 | 25 | 25 |
| Flow volume of application water carrier gas ($Nm^3$/min) | | 0.65 | 0.42 | 4 | 0.65 | 0.65 | 0.8 |
| Flow volume of spray material carrier gas ($Nm^3$/min) | | 4 | 6 | 2 | 6.5 | 0.65 | 4 |
| Carrier gas flow ratio | | 0.16 | 0.070 | 2.0 | 0.10 | 1.0 | 0.20 |
| Application water volume ($m^3$/min) | | 0.0042 | 0.0042 | 0.0042 | 0.0042 | 0.0042 | 0.008 |
| Gas/application water volume ratio | | 154.8 | 100.0 | 952.4 | 154.8 | 154.8 | 100.0 |
| Discharge volume of spray material (kg/min) | | 30 | 40 | 40 | 30 | 30 | 4.8 |
| Carrier gas total flow volume ($Nm^3$/min) | | 4.65 | 6.42 | 6 | 7.15 | 1.3 | 4.8 |
| Solid/gas ratio | | 6.5 | 6.2 | 6.7 | 4.2 | 23.1 | 1.0 |
| Water mixability | | Fair | Fair | Good | Good | Good | Fair |
| Carriage property | | Fair | Good | Fair | Good | Good | Fair |
| Comprehensive evaluation | | Fair | Fair | Fair | Good | Good | Fair |

| | | Example 7 | Example 8 | Example 9 | Example 10 | Example 11 | Example 12 |
|---|---|---|---|---|---|---|---|
| Spray material | Particle size: more than 2 mm (mass %) | 15 | 15 | 15 | 15 | 15 | 15 |
| | Particle size: more than 45 μm to 2 mm (mass %) | 70 | 70 | 70 | 70 | 70 | 70 |
| | Particle size: 45 μm or less (mass %) | 15 | 15 | 15 | 15 | 15 | 15 |

TABLE 1-continued

Table 1

| | | | | | | |
|---|---|---|---|---|---|---|
| Compressibility index (%) | 25 | 25 | 25 | 25 | 25 | 25 |
| Flow volume of application water carrier gas (Nm³/min) | 1 | 0.8 | 0.7 | 0.8 | 0.65 | 0.65 |
| Flow volume of spray material carrier gas (Nm³/min) | 10 | 8 | 4 | 4 | 2 | 10 |
| Carrier gas flow ratio | 0.10 | 0.10 | 0.18 | 0.20 | 0.33 | 0.07 |
| Application water volume (m³/min) | 0.001 | 0.006 | 0.0028 | 0.001 | 0.0042 | 0.0042 |
| Gas/application water volume ratio | 1000.0 | 133.3 | 250.0 | 800.0 | 154.8 | 154.8 |
| Discharge volume of spray material (kg/min) | 11 | 176 | 30 | 30 | 60 | 10 |
| Carrier gas total flow volume (Nm³/min) | 11 | 8.8 | 4.7 | 4.8 | 2.65 | 10.65 |
| Solid/gas ratio | 1.0 | 20.0 | 6.4 | 6.3 | 22.6 | 0.9 |
| Water mixability | Fair | Good | Good | Good | Fair | Fair |
| Carriage property | Fair | Good | Good | Good | Fair | Fair |
| Comprehensive evaluation | Fair | Good | Good | Good | Fair | Fair |

The results from all of Examples 1 to 12 in Table 1 were included within the range of the present invention with the carrier gas flow ratios being 0.07 to 2, and the compressibility indexes of the spray material being 32% or less. The water mixabilities and the carriage properties were not evaluated as poor, and were thus favorable. Consequently, the comprehensive evaluations were favorable.

Second Set of Examples

Table 2 lists a second set of examples of the present invention. In the examples, the spray apparatus in FIG. 2 was used to perform the spray application. The pressures of the application water carrier gas, the spray material carrier gas, and the gas injected from the injecting means 8 were set within the range of 0.2 MPa to 0.5 MPa in a similar manner to the first set of examples.

The spray material having the same material composition as that of the first set of examples was used. The method of evaluating the water mixability and the carriage property, and the criterion of the comprehensive evaluation were also the same as those of the first set of examples.

TABLE 2

Table 2

| | | Example 13 | Example 14 |
|---|---|---|---|
| Spray material | Particle size: more than 2 mm (mass %) | 15 | 15 |
| | Particle size: more than 45 μm to 2 mm (mass %) | 70 | 70 |
| | Particle size: 45 μm or less (mass %) | 15 | 15 |
| | Compressibility index (%) | 25 | 25 |
| Flow volume of application water carrier gas from water injector (Nm³/min) | | 0.42 | 0.42 |
| Flow volume of application water carrier gas from injecting means (Nm³/min) | | 0.42 | 0.42 |
| Flow volume of spray material carrier gas (Nm³/min) | | 6 | 6 |
| Carrier gas flow ratio | | 0.14 | 0.14 |
| Application water volume from water injector (m³/min) | | 0.0042 | 0.0042 |
| Application water volume from injecting means (m³/min) | | 0.0005 | 0 |
| Gas/application water volume ratio | | 178.7 | 200.0 |
| Discharge volume of spray material (kg/min) | | 20 | 20 |
| Carrier gas total flow volume (Nm³/min) | | 6.84 | 6.84 |
| Solid/gas ratio | | 2.9 | 2.9 |
| Water mixability | | Good | Good |
| Carriage property | | Good | Good |
| Comprehensive evaluation | | Good | Good |

In Table 2, the injecting means 8 injected the application water together with the gas (the application water carrier gas) in Example 13, and the injecting means 8 injected only the gas in Example 14. The results from both Examples 13 and 14 were included within the range of the present invention with the carrier gas flow ratios being 0.07 to 2, and the compressibility indexes of the spray material being 32% or less. The water mixabilities and the carriage properties were not evaluated as poor, and were thus favorable. Consequently, the comprehensive evaluations were favorable.

REFERENCE SIGNS LIST

1 MATERIAL SUPPLY DEVICE
2 SPRAY MATERIAL
3 TABLE FEEDER
4 DISTAL SPRAY NOZZLE
5 MATERIAL CARRIER PIPE
6 SPRAY MATERIAL CARRIER GAS INTRODUCTION PIPE
7 WATER INJECTOR
8 INJECTING MEANS
A SPRAY TARGET OBJECT

The invention claimed is:

1. A method for spray application of a monolithic refractory, the method comprising disposing a water injector in a material carrier pipe extending from a material supply device to a distal spray nozzle, and injecting application water from the water injector into a spray material that is being carried through the material carrier pipe, wherein
   a ratio of a flow volume (Nm³/min) of an application water carrier gas for carrying the application water to be introduced into the water injector to a flow volume (Nm³/min) of a spray material carrier gas for carrying the spray material (the flow volume of the application water carrier gas/the flow volume of the spray material carrier gas) is 0.07 to 2, and a compressibility index of the spray material is 32% or less.

2. The method for spray application of a monolithic refractory as claimed in claim 1, wherein
   injecting means adapted to inject gas or application water together with the gas into the spray material is disposed on an upstream side of the water injector, and
   an application water volume from the injecting means is 20 mass % or less (including 0 mass %) of a total application water volume, and a remaining application water volume of the total application water volume is injected from the water injector.

3. The method for spray application of a monolithic refractory as claimed in claim 1, wherein a ratio of a discharge volume (kg/min) of the spray material to a total flow volume ($Nm^3$/min) of the carrier gases (the discharge volume of the spray material/the total flow volume of the carrier gases) is 1 to 20.

4. The method for spray application of a monolithic refractory as claimed in claim 1, wherein in the spray material, a content of particles having a particle size of more than 2 mm is 30 mass % or less (including 0 mass %), and a content of particles having a particle size of 45 μm or less is 3 mass % to 30 mass %.

5. A method for spray application of a monolithic refractory, the method comprising disposing a water injector in a material carrier pipe extending from a material supply device to a distal spray nozzle, and injecting application water from the water injector into a spray material that is being carried through the material carrier pipe, wherein
a ratio of a flow volume ($Nm^3$/min) of an application water carrier gas for carrying the application water to be introduced into the water injector to an application water volume ($m^3$/min) (the flow volume of the application water carrier gas/the application water volume) is 100 to 1,000, and a compressibility index of the spray material is 32% or less.

6. The method for spray application of a monolithic refractory as claimed in claim 5, wherein
injecting means adapted to inject gas or application water together with the gas into the spray material is disposed on an upstream side of the water injector, and
an application water volume from the injecting means is 20 mass % or less (including 0 mass %) of a total application water volume, and a remaining application water volume of the total application water volume is injected from the water injector.

7. The method for spray application of a monolithic refractory as claimed in claim 5, wherein a ratio of a discharge volume (kg/min) of the spray material to a total flow volume ($Nm^3$/min) of the carrier gases (the discharge volume of the spray material/the total flow volume of the carrier gases) is 1 to 20.

8. The method for spray application of a monolithic refractory as claimed in claim 5, wherein in the spray material, a content of particles having a particle size of more than 2 mm is 30 mass % or less (including 0 mass %), and a content of particles having a particle size of 45 μm or less is 3 mass % to 30 mass %.

* * * * *